US008827710B2

(12) United States Patent
Zitnick, III et al.

(10) Patent No.: US 8,827,710 B2
(45) Date of Patent: Sep. 9, 2014

(54) REALTIME USER GUIDANCE FOR FREEHAND DRAWING (75) Inventors: Charles Lawrence Zitnick, III, Seattle, WA (US); Yong Jae Lee, Austin, TX (US); Michael Cohen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 75 days.

(21) Appl. No.: 13/110,923

(22) Filed: May 19, 2011

(65) Prior Publication Data
US 2012/0295231 A1 Nov. 22, 2012

(51) Int. Cl.
G09B 11/10 (2006.01)
G09B 11/00 (2006.01)

(52) U.S. Cl.
CPC ............................... G09B 11/10 (2013.01); G09B 11/00 (2013.01)
USPC ............................................ 434/85; 434/155

(58) Field of Classification Search
CPC ......... G09B 11/04; G09B 11/00; G09B 11/10
USPC .......................................................... 434/85
See application file for complete search history.

(56) References Cited

U.S. PATENT DOCUMENTS

| 5,371,845 | A | 12/1994 | Newell et al. | |
|---|---|---|---|---|
| 5,687,254 | A | 11/1997 | Poon et al. | |
| 6,731,826 | B1 * | 5/2004 | Yamamoto et al. | 382/305 |
| 7,212,968 | B1 | 5/2007 | Garner et | |
| 7,295,688 | B2 | 11/2007 | Hara et al. | |
| 7,379,627 | B2 * | 5/2008 | Li et al. | 382/305 |
| 7,590,307 | B2 * | 9/2009 | Wang et al. | 382/300 |
| 7,593,602 | B2 | 9/2009 | Stentiford | |
| 7,616,201 | B2 * | 11/2009 | Foster | 345/426 |
| 7,639,250 | B2 * | 12/2009 | Xu et al. | 345/419 |
| 7,647,331 | B2 * | 1/2010 | Li et al. | 382/218 |
| 8,213,719 | B2 * | 7/2012 | Vukosavljevic et al. | 382/186 |
| 8,300,883 | B2 * | 10/2012 | Wang et al. | 382/100 |
| 2001/0038999 | A1 * | 11/2001 | Hainey, II | 434/85 |
| 2005/0100243 | A1 * | 5/2005 | Shum et al. | 382/276 |

(Continued)

OTHER PUBLICATIONS

Changhu Wang, Zhiwei Li and Lei Zhang, MindFinder: image search by interactive sketching and tagging, Proceedings of the 19th international conference on World wide web pp. 1309-1312, Apr. 26-30, 2010, Raleigh, NC, USA.*

(Continued)

*Primary Examiner* — Sam Yao
*Assistant Examiner* — Thomas Hong
(74) *Attorney, Agent, or Firm* — Steve Wight; Carole Boelitz; Micky Minhas (57) ABSTRACT

Architecture that guides the freeform drawing of objects by a user to enable the user to produce improved drawings without significant training. As the user draws, the architecture dynamically updates a relevant shadow image proximate (e.g., underlying) the user's strokes. The strokes overlay an evolving shadow image, which shadow image is suggestive of object contours that guide the user during the drawing process. Relevant edge images selected from a large database are automatically blended to construct the shadow image. As the user draws, the strokes are dynamically analyzed using an encoding of overlapping windows for fast matching with the database of images. A top ranked set of matching database edge images are aligned to the drawing, a set of spatially varying weights blend the edge images into the shadow image, and a scoring technique is employed to select the optimum shadow image for display.

20 Claims, 9 Drawing Sheets

(56) References Cited

U.S. PATENT DOCUMENTS

| | | | |
|---|---|---|---|
| 2006/0045343 A1* | 3/2006 | Tremblay et al. | 382/186 |
| 2007/0112754 A1* | 5/2007 | Haigh et al. | 707/5 |
| 2008/0003549 A1* | 1/2008 | Fine et al. | 434/155 |
| 2009/0278848 A1* | 11/2009 | Robertson et al. | 345/440.2 |
| 2011/0142370 A1* | 6/2011 | Joshi et al. | 382/307 |

OTHER PUBLICATIONS

Raymaekers, et al., "Improving Sketching by Utilizing Haptic Feedback", Retrieved at <<http://www.aaai.org/Papers/Symposia/Spring/2002/SS-02-08/SS02-08-017.pdf>>, AAAI Technical Report SS-02-08. Compilation copyright, 2002.

Arvo, et al., "Fluid Sketches: Continuous Recognition and Morphing of Simple Hand-drawn Shapes", Retrieved at <<http://citeseerx.ist.psu.edu/viewdoc/download;jsessionid=721C2DE3D729271764E3B2D50CAA92C0?doi=10.1.1.37.9176&rep=rep1&type=pdf>>, In Proceedings of the 13th Annual ACM Symposium on User Interface Software and Technology, 2000.

Ballard, D.H., "Generalizing the Hough Transform to Detect Arbitray Shapes", Retrieved at <<http://www.eecs.umich.edu/~silvio/teaching/EECS598/papers/Ballard.pdf>>, vol. 13, No. 2, 1981.

Beaudot, et al., "How Long Range is Contour Integration in Human Color Vision", Retrieved at <<http://wbeaudot.kybervision.com/PUBLICATIONS/FILES/Beaudot2003VisNeuro.pdf>>, 2003.

Canny, John, "A Computational Approach to Edge Detection", Retrieved at <<http://www.limsi.fr/Individu/vezien/PAPIERS_ACS/canny1986.pdf>>, IEEE Transactions on Pattern Analysis and Machine Intelligence, vol. PAMI-8, No. 6, Nov. 1986.

Carson, et al., "Blobworld: Image Segmentation using Expectation Maximization and its Application to Image Querying", Retrieved at <<http://ieeexplore.ieee.org/stamp/stamp.jsp?tp=&arnumber=1023800>>, IEEE Transactions on Pattern Analysis and Machine Intelligence, vol. 24, No. 8, Aug. 2002.

Chen, et al., "Sketch2photo: Internet Image Montage", Retrieved at <<http://www.ece.nus.edu.sg/stfpage/eletp/papers/sigasia09_sketch2photo.pdf>>, 2009.

Chum, et al., "Total Recall: Automatic Query Expansion with a Generative Feature Model for Object Retrieval", Retrieved at <<http://www.robots.ox.ac.uk/~vgg/publications-new/Public/2007/Chum07b/chum07b.pdf>>, 2007.

Chum, et al., "Near Duplicate Image Detection: min-hash and tf-idf Weighting", Retrieved at <<http://www.robots.ox.ac.uk/~vgg/publications/papers/chum08a.pdf>>, 2008.

Cole, et al., "Where do People Draw Lines?", Retrieved at <<http://www.cs.princeton.edu/gfx/pubs/Cole_2008_WDP/cole_2008_wdp.pdf>>, 2008.

Datta, et al., "Image Retrieval: Ideas, Influences, and Trends of the New Age", Retrieved at <<http://infolab.stanford.edu/~wangz/project/imsearch/review/JOUR/datta.pdf>>, ACM Computing Surveys, vol. 40, No. 2, Article 5, Apr. 2008.

Eitz, et al.,"Photosketch: A Sketch based Image Query and Compositing System", Retrieved at <<http://user.cs.tu-berlin.de/~eitz/pdf/2009_photosketch.pdf>>, 2009.

Elder, et al., "Image Editing in the Contour Domain", Retrieved at <<http://ieeexplore.ieee.org/stamp/stamp.jsp?tp=&arnumber=698633>>, IEEE Transactions on Pattern Analysis and Machine Intelligence, vol. 23, No. 3, Mar. 2001.

Fei-Fei, et al., "Learning Generative Visual Models from Few Training Examples: An Incremental Bayesian Approach Tested on 101 Object Categories", Retrieved at <<http://www.vision.caltech.edu/feifeili/Fei-Fei_GMBV04.pdf>>, Computer Vision and Pattern Recognition Workshop, 2004.

Gavilan, et al., "Sketch-to Collage", Retrieved at <<http://www.img.cs.titech.ac.jp/~david/papers/sap_0333.pdf>>, Special Interest Group on Computer Graphics and Interactive Techniques Conference, Aug. 5-9, 2007.

Hays, et al., "Scene Completion using Millions of Photographs", Retrieved at <<http://graphics.cs.cmu.edu/projects/scene-completion/scene-completion.pdf>>, Computer Graphics Proceedings, Annual Conference Series, 2007.

Igarashi, et al., "A Suggestive Interface for 3D Drawing", Retrieved at <<http://citeseerx.ist.psu.edu/viewdoc/download?doi=10.1.1.17.334&rep=rep1&type=pdf>>, 2001.

Igarashi, et al., "Teddy: A Sketching Interface for 3D Freeform Design", Retrieved at <<http://citeseerx.ist.psu.edu/viewdoc/download?doi=10.1.1.75.1790&rep=rep1&type=pdf>>, 1999.

Jacobs, et al., "Fast Multiresolution Image Querying", Retrieved at <<http://grail.cs.washington.edu/projects/query/mrquery.pdf>>, 1995.

Lee, et al., "Partition Min-hash for Partial Duplicate Image Discovery", Retrieved at <<http://www.cs.cmu.edu/~dclee/pub/eccv10lee.pdf>>, 11th European Conference on Computer Vision (ECCV), 2010.

Lowe, David G., "Distinctive Image Features from Scale-invariant Keypoints", Retrieved at <<http://www.cs.ubc.ca/~lowe/papers/ijcv04.pdf>>, 2004.

Nister, et al., "Scalable Recognition with a Vocabulary Tree", Retrieved at <<http://ieeexplore.ieee.org/stamp/stamp.jsp?tp=&arnumber=1641018>>, Proceedings of the 2006 IEEE Computer Society Conference on Computer Vision and Pattern Recognition (CVPR'06), 2006.

Sivic, et al., "Creating and Exploring a Large Photorealistic Virtual Space", Retrived at <<http://www.di.ens.fr/~josef/publications/sivic08a.pdf>>, IEEE Computer Society Conference on Computer Vision and Pattern Recognition Workshops, Jun. 23-28, 2008.

Winder, et al., "Picking the Best Daisy", Retrieved at <<http://research.microsoft.com/pubs/79807/winder_hua_brown_cvpr09.pdf>>, Computer Vision and Pattern Recognition, Jun. 2009.

Zitnick, C. Lawrence., "Binary Coherent Edge Descriptors", Retrieved at <<http://citeseerx.ist.psu.edu/viewdoc/download;jsessionid=36C508781C133A4A7EACA86AFD617514?doi=10.1.1.172.6468&rep=rep1&type=pdf>>, Computer Vision—ECCV, 11th European Conference on Computer Vision, Sep. 5-11, 2010.

Bhat, P. et al.; "GradientShop: A gradient-domain optimization framework for image and video filtering"; ACM Trans. Graph. vol. 29, No. 2; Article 10; Apr. 2010; 14 pages.

Cao, Y. et al.; "Mindfinder: Finding images by Sketching"; ACM Multimedia International Conference; Apr. 26-30, 2010; 5 pages.

Witten, I. et al.; "Managing Gigabytes: Compressing and Indexing Documents and Images"; Morgan Kaufmann; 1999. (in 5 PDFs).

* cited by examiner

REALTIME USER GUIDANCE FOR FREEHAND DRAWING

BACKGROUND

The huge volume of image and video data available on the networks (e.g., the Internet), scientific databases, and newspaper archives, along with recent advances in efficient (approximate) image matching schemes have opened the door for a number of large scale matching applications. The general field of content based image retrieval (CBIR) uses many different input modalities to search for similar images in a database.

In the realm of freeform hand sketches using interactive displays and a standard drawing interface, if a novice user is asked to sketch a face, the result will typically look rough and unrefined. Similarly, if asked to draw a bicycle, for example, most of users would have a difficult time depicting how the frame and wheels relate to each other.

One solution is to search for an image of the object to be drawn, and to either trace the object or use the object in some other way, such as for a reference. However, aside from the difficulty of finding an image of what is to be drawn, simply tracing object edges eliminates much of the essence of drawing (there is very little freedom in tracing strokes). Conversely, drawing on blank paper with only the image in the mind's eye gives the drawer more freedom. Without significant training it is difficult to get the relative proportions of objects correct. Thus, freehand drawing remains a frustrating endeavor.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture guides the freeform drawing of objects by a user to enable the user to produce improved drawings without significant training. As the user draws, the architecture dynamically updates a relevant shadow image underlying the user's strokes. The shadow images are suggestive of object contours that guide the user during the drawing process. The architecture automatically blends relevant edge images from a large database to construct the shadow. The shadows can either be used or ignored by the drawer.

The architecture preserves the essence of drawing (freedom and expressiveness) and at the same time uses the shadow images as visual references to guide the drawer. Furthermore, shadows obtained from real images can enlighten the artist with the gist of many images simultaneously. The creation becomes a mix of both human intuition and computer intelligence. The computer, in essence, is a partner in the drawing process, providing guidance like a teacher, instead of actually producing the final artwork. The user's own creative styles remain consistent in the drawings, while the overall shapes and spacing are more realistic.

The architecture includes a user interface and two computational processes. An offline step builds a database of images from images collected from the Internet. Each image is converted to an edge drawing using an existing long edge detector technique, and then stored. Numerous overlapping windows in each edge image are analyzed into edge descriptors, which are further coded as sketches with distinct hash keys (e.g., using min-hash), and then stored.

As the user draws, the architecture dynamically analyzes the strokes using a similar encoding to determine hash keys for overlapping windows for fast matching with the database of images. A top ranked set (e.g., one hundred) of matching database edge images are further aligned to the drawing. A set of spatially varying weights are used to blend the edge images into a shadow image. A scoring method is employed to select the optimum image for display. In the user interface, the strokes are overlaid on top of an evolving shadow image to provide guidance for potential future strokes.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture is an interactive system that dynamically adapts to the user's sketching and provides realtime feedback. The architecture employs a framework of content based image retrieval (CBIR) as well as a technique of partial spatial matching, and enables multiple matching images based on different sub-regions of the image. In addition, a verification stage and methods for determining blending weights are employed.

As the user draws, a shadow image underlying the user strokes is dynamically updated. The shadows are suggestive of object contours that guide the user during the ongoing drawing process. Relevant edge images are obtained from a large database of images and automatically blended to construct the shadow image.

As described herein, the architecture also provides the capability of an image (visual object) retrieval system that searches and returns candidate images for processing. In other words, a set of images is produced for selection and processing that is similar to the user sketch (or drawing).

Reference is now made to the drawings, wherein like reference numerals are used to refer to like elements throughout.

In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
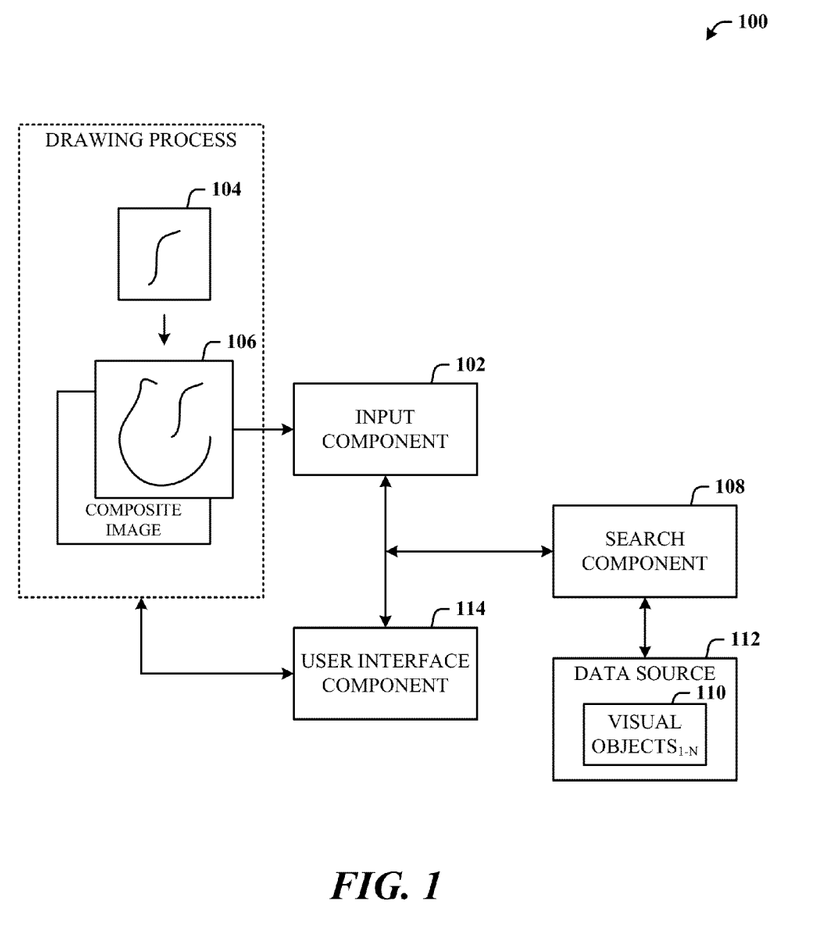
FIG. 1 illustrates a system in accordance with the disclosed architecture.

FIG. 1 illustrates a system 100 in accordance with the disclosed architecture. The system 100 includes an input component 102 that receives a freeform user stroke 104 (e.g., by pen, touch, mouse, etc.) in association with an interactive surface (e.g., a touch screen, pen-based display, standard non-touch display, etc.). The stroke 104 is input to a drawing process that includes an evolving drawing 106. A search component 108 searches and retrieves matching visual objects 110 from a datasource 112 in response to input of the user stroke 104. The visual objects include images, other user-generated hand sketches, art work, photos, web content, video content, and so on. The matching visual objects 110 have object portions which match a part of the evolving drawing 106.

The system 100 can further include a user interface (UI) component 114 (e.g., a drawing program UI) that presents a dynamically changing composite image 116 of the matching visual objects 110 proximate the user stroke 104 during the drawing process to guide the drawing process.

Figure 2:
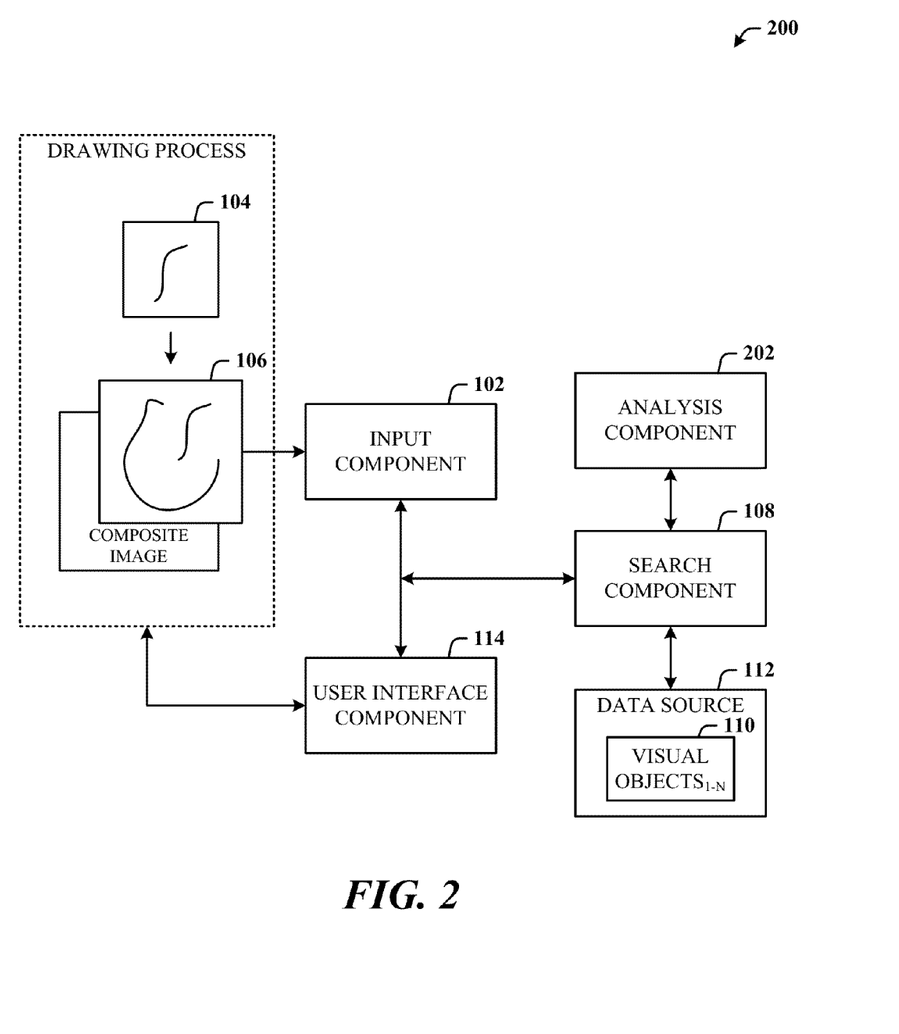
FIG. 2 illustrates an alternative system that shows an analysis component.

FIG. 2 illustrates an alternative system 200 that shows an analysis component 202. The analysis component performs all the analysis capabilities for visual object matching including, but not limited to, candidate matching, alignment, and weighting. For example, the analysis component 202 performs verification of candidate visual objects by alignment of the candidate visual objects to the evolving drawing to obtain matching scores and computation of weights for the candidate visual objects based on the scores. The analysis component 202 computes a score for a candidate visual object based on similarity between an edge orientation of the candidate visual object and the user stroke. The analysis component 202 computes global and spatially varying weights to blend corresponding edge images of candidate visual objects into the composite image. The analysis component 202 performs spatial matching to obtain multiple matching visual objects that include different sub-regions which match parts of the evolving drawing.

Following is a detailed description of the disclosed architecture for realtime guidance for freehand drawing.

The architecture includes the construction of an inverted file structure that indexes a database of visual objects (e.g., images) and associated edge maps; a query method that, given user strokes, dynamically retrieves matching visual objects, aligns the objects to the evolving drawing and weights the objects based on a matching score; and, the user interface for drawing, which displays a shadow of weighted edge maps proximate (e.g., beneath) the user's drawing to guide the drawing process.

With respect to database creation, the visual objects in the database are selected so that the objects depicted, as well as object appearance and pose, are likely to be similar to those drawn by the user. Note that although the term "image" or "images" is used during this description, it is to be understood that an image is one form of visual object, and the description herein applies to all types of visual objects, including images. A large database of hand drawn images can be used. Alternatively, a set of natural images collected from the Internet via categorical image queries such as "t-shirt", "bicycle", "car", etc., as well as from category specific databases can be employed. Although such images have many extraneous backgrounds, objects, framing lines, etc., on average, the images will contain edges a user may want to draw.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
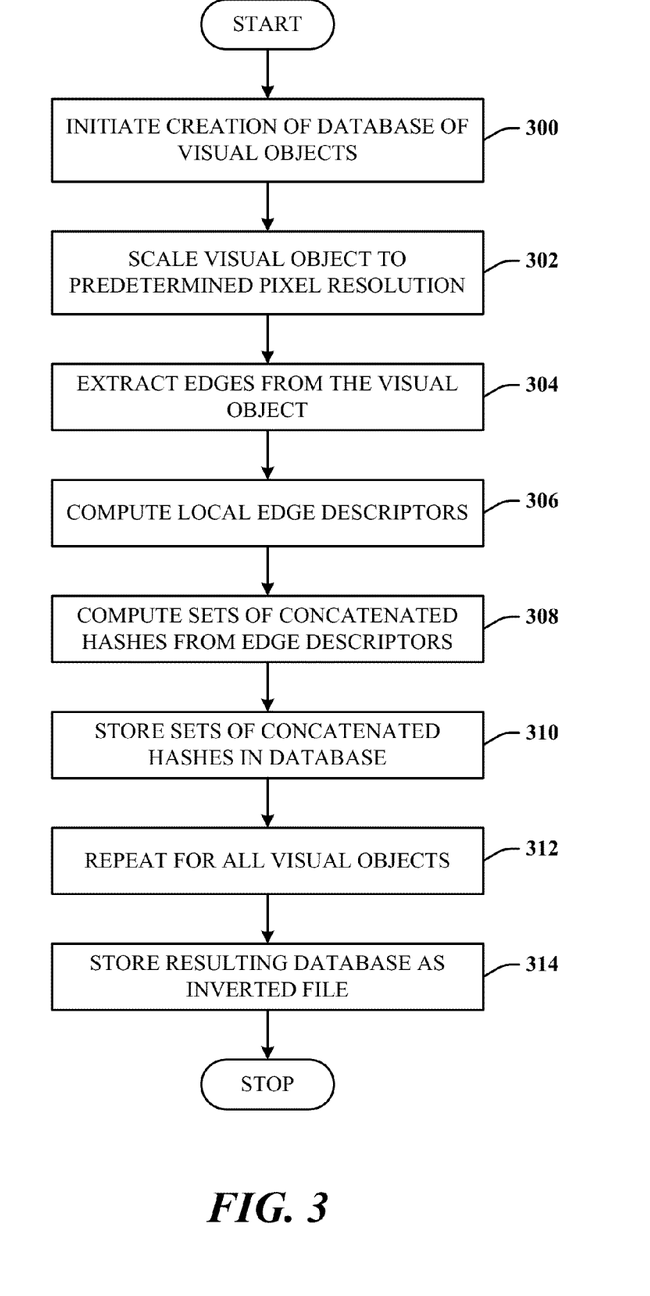
FIG. 3 illustrates a flowchart of an exemplary database creation process.

FIG. 3 illustrates a flowchart of an exemplary database creation process. At 300, database creation of visual objects is initiated. At 302, each visual object is scaled to a predetermined pixel resolution. At 304, edges from the visual object are extracted. At 306, local edge descriptors are computed. At 308, set of concatenated hashes are computed from the edge descriptors. At 310, the sets of concatenated hashes are stored in a database. At 312, the above steps are repeated for all visual objects. At 314, the resulting database is stored as an inverted file.

More specifically, the images are scaled to fit a predefined pixel resolution (e.g., 300×300). Each image is then processed in three stages and added to an inverted file structure. First, edges are extracted from the image. Next, local edge descriptors are computed. Finally, sets of concatenated hashes (called sketches) are computed from the edge descriptors and added to the database. The database is stored as an inverted file, in other words, indexed by sketch value, which in turn points to the original image, its edges, and the position of the edge descriptor used to compute the sketch.

With respect to edge extraction, given a natural image (a form of visual object), it is desired to find the edges most likely to be drawn by a user while ignoring others. The method of edge detection locally normalizes the magnitudes of the edges, and then sums the normalized magnitudes, weighted by local curvature, along the length of the edge. The result is an edge response that is related to the length of the edge and its degree of curvature, rather than the magnitude of the intensity gradients. The edge images E can be stored using run length encoding.

With respect to patch descriptors, for each edge image, edge positions are determined by finding maxima in the responses perpendicular to the edge direction. The edge's orientation is found using a standard second order operator [−1, 2, −1] applied to the final edges in both horizontal and vertical directions. (The operator is a discrete differential operator used in image processing for edge detection.) Given an image I in the database with corresponding edges E and orientations θ, a set of edge descriptors $d_i \epsilon D$ is computed. Since the goal is to match an edge image E to incomplete and evolving drawings, the descriptors are computed locally over predetermined patch dimension (e.g., 60×60 patches). The patches used to compute neighboring descriptors can overlap by fifty percent, resulting in eighty-one descriptors over the fixed grid (e.g., 9×9) of patches.

The descriptors can be computed using the BiCE (binary coherent edge) descriptor algorithm, which encodes a histogram of edge positions and orientations. Since the edges drawn by a user are typically less dense than in natural images, a low dimensional version of BiCE can be employed.

A three dimensional histogram can be defined with four discrete edge orientations, eighteen positions perpendicular to the edge, and six positions tangent to the edge. In this example, and using a conventional notation, set $n_x=18$, $n_y=6$, $n_\theta=4$, and $n_f=1$. The buckets of the histogram can be binarized by setting the top twenty percent to one and the rest to zero. The final descriptor d, has four-hundred thirty-two binary bits, with eighty-six ones and three-hundred forty-six zeros.

A feature of the BiCE descriptor is its binary encoding: it can be viewed as a set representation where the ones indicate edge presence. This makes it amenable to min-hash, which is an effective hashing technique for retrieval and clustering. Min-hash has the property that the probability of two sets having the same hash value ("colliding") is equal to their Jaccard similarity. The Jaccard similarity $sim(d_i, d_j)$ between two sets, $d_i$ and $d_j$, is the cardinality of the intersection divided by the cardinality of the union:

$$sim(d_i, d_j) = \frac{\#(d_i \cap d_j)}{\#(d_i \cap d_j)}. \tag{1}$$

A min-hash function randomly permutes the set of indices (the ones and zeros). All sets (BiCE descriptors) are permuted using the same min-hash function. The min-hash value for a given permuted set is its smallest index containing a one after the permutation. A single min-hash can be non-discriminative and introduce many false positive retrievals, especially if the descriptor is non-sparse. To increase precision, k independent random min-hash functions can be computed and applied to all BiCE descriptors.

The resulting k min-hash values are concatenated for each descriptor into k-tuples, called sketches. The probability of two sketches colliding is thus reduced exponentially to sim $(d_i, d_j)^k$. To increase recall, this process is repeated n times using n different sets of k min-hash functions, resulting in n sketches per descriptor. To maintain high recall while reducing false positives, tradeoffs are made between the number of sketches stored for each descriptor and the size of the sketch, k. In one implementation, n=20 sketches of size k=3 are stored for each descriptor.

An inverted file structure is stored for each of the n min-hash sketches. Each unique sketch is allocated as a new entry in the structure. The image index and patch location of the descriptor instance that produced the sketch are recorded.

With respect to image matching, the disclosed hashing scheme allows for efficient image queries, since only images with matching sketches need to be considered.

Figure 4:
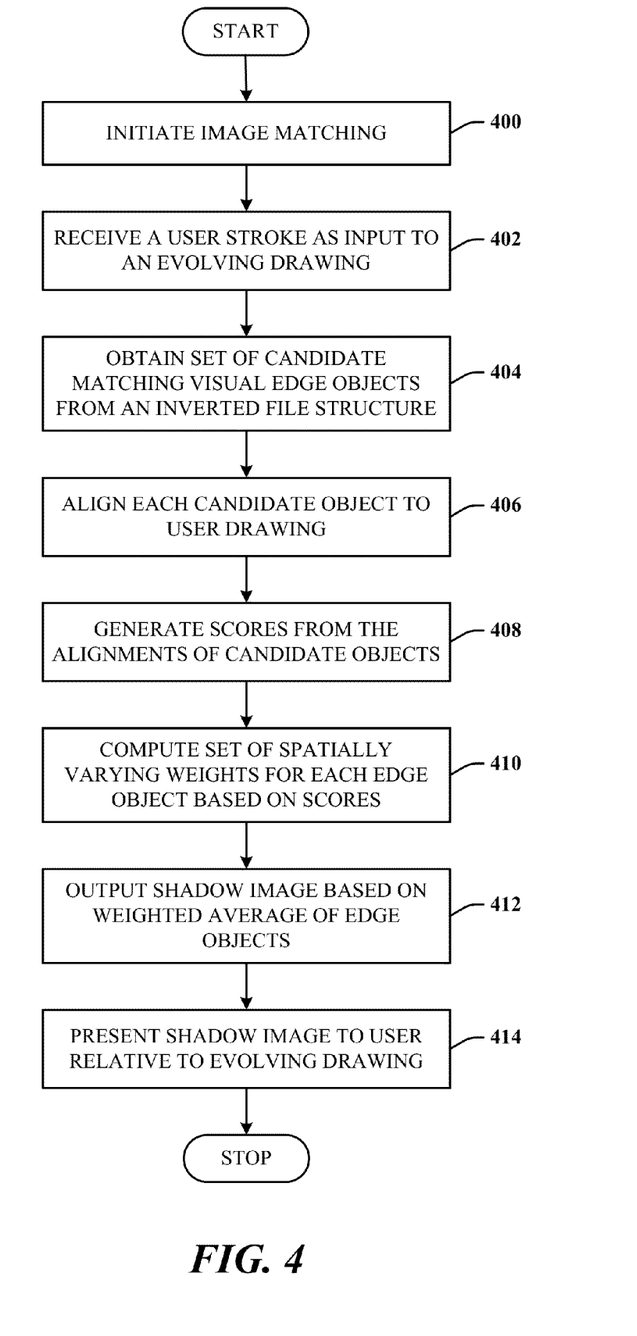
FIG. 4 illustrates a flowchart of an exemplary image matching algorithm.

A realtime matching pipeline between the edge images in the database and the user's drawing is now described. FIG. 4 illustrates a flowchart of an exemplary image matching algorithm. At 400, image matching is initiated. At 402, a user stroke is received as input to an evolving drawing. At 404, a set of candidate matching visual objects is obtained from an inverted file structure. At 406, each candidate match is aligned with the user's drawing. At 408, Scores from the alignments of candidate objects are generated. At 410, the scores are used to compute a set of spatially varying weights for each edge image. At 412, the output is a shadow image resulting from the weighted average of the edge images. At 414, the shadow image is displayed to the user.

With respect to candidate matches, the user's drawing is recorded as a set of vectorized multi-segment strokes. An edge image $\tilde{E}$ is created from these strokes by drawing lines (e.g., with a width of one pixel between the stroke points). The rendered lines have the same style as the edges extracted from the natural images in the database (the edge image $\tilde{E}$ used for matching does not need to use the stylized strokes that are seen by the user). The BiCE descriptors and corresponding sketches are computed as described above, using a higher resolution grid (e.g., 18×18=324 patches) with seventy-five percent overlap between neighboring patches. A higher resolution grid is used to increase the accuracy of the predicted position and to increase invariance to translations in the drawing. In one implementation, the user's drawing occupies an area of 480×480 pixels, resulting in 96×96 pixel patches with twenty-four pixel offsets between neighboring patches. Descriptors and sketches can be computed for each of the three-hundred twenty-four patches.

Using the inverse lookup table, each sketch from the user's drawing is matched to the sketches stored in the database. A matching sketch casts one vote for the corresponding database image and patch offset pair. The matches are aggregated in a histogram H storing the number of matching sketches for each image at each grid offset. To reduce the size of H, votes are only stored if the database patch offset is within four patch grid points of the patch being considered in the user's drawing. This corresponds to relative shifts of less than ninety-six pixels between the user's drawing and the database images. The resulting histogram has size m×9×9, where m is the number of images in the database. After adding all the matches for each sketch to the histogram, the optimum matching offset is found for each image, and the top one-hundred images are added to the candidate set C. n=20 sketches are computed for each descriptor, resulting in a maximum possible twenty votes per sketch in the histogram. To reduce the bias from any single descriptor, each descriptor can be limited to at most four votes in the histogram.

Given a large database, computing the candidate set as described above can be computationally expensive. However, user strokes change gradually over time to increase performance, thus, at each time step, only votes resulting from sketches derived from patches that have changed, are updated. This can be accomplished by subtracting the votes added from the previous sketches from H, followed by adding in the votes from the new sketches. At each time frame, any candidate image from the previous time frame that contributed to the shadow image can also be added to the candidate set, if not already present.

With respect to image alignment, the candidate image set of candidates C contains a set of images with approximate offsets $d_x$ and $d_y$ defined by the optimum matching offset, as described above. The approximation arises from the discretization of the offsets in the grid of patches. These offsets can be refined using a 1D (one-dimensional) variation of the Generalized Hough transform. Using the standard Generalized Hough transform for 2D (two-dimensional) translations, a 2D histogram T over possible offsets x and y is created using:

$$T(x, y) = \sum_p \tilde{E}(p_x, p_y) E(p_x + d_x + x, p_y + d_y + y) \tag{2}$$

where $\tilde{E}(p_x, p_y)$ is the value of $\tilde{E}$ at pixel p in location $(p_x, p_y)$, and similarly for the edge image E. The optimum offset can be determined by finding the maximum value of T(x,y). This approach can be computationally expensive due to the need to sum over the image for every possible combination of x and y offsets. Alternatively, compute the x and y dimensions separately using two histograms:

$$T_x(x) = \sum_p \sin(\tilde{\theta}(p_x, p_y))\tilde{E}(p_x, p_y) \qquad (3)$$

$$\sin(\theta(p_x + d_x + x, p_y + d_y))E(p_x + d_x + x, p_y + d_y)$$

and similarly for $T_y$ using the cosine of the angles. The sine of the edge angles provides higher weights to the more informative vertical edges when determining the horizontal offsets, and similarly for $T_y$ and cosine with horizontal edges. Once the histograms $T_x$ and $T_y$ are created, the histograms are slightly blurred with $\sigma_h=2$. The final sub-pixel offsets $d'_x$ and $d'_y$ are determined by adding a quadratic interpolation of the resulting peak response in $T_x$ and $T_y$ to $d_x$ and $d_y$. For additional accuracy, two iterations can be run. To reduce computation, the search range of x and y can be limited to twice the distance between the grid points. In addition, equation (3) is computed on reduced resolution images (e.g., size 160×160). If desired, another one-dimensional histogram may be similarly computed over scale to provide scale alignment between the user drawing and the line images. The aligned edge image is denoted as $E'_i$.

With respect to image weighting, there now exists a set of candidate images, C, and associated aligned edge images $E'_i$, aligned using offsets $d'_i$. The intent is now to blend these aligned edge images into a shadow image S that will help guide the user as the user draws. To do so, blending weight images $W_i$ are constructed.

$$S = \sum_i W_i E'_i$$

The blending weight can be set high where there is a good match between the drawing and the candidate's aligned edges, and low, where there is not a good match. The weight image can be constructed from two terms: a global matching term, $v_i$ and a spatially varying matching term, $V_i$, normalized as follows over all images in the candidate set:

$$W_i = \frac{v_i V_i}{\sum_i v_i V_i + \epsilon} \qquad (5)$$

The parameter $\epsilon$ is included in the normalization to avoid a noisy shadow just as the drawing begins and all match scores are low. The values of $v_i$ and $V_i$ are defined based on the global and spatially varying matching scores respectively, $u_i$ and $U_i$ (described below), based on edge matches at discrete orientations (e.g., eight).

The overall weight, $v_i$, and $\epsilon$ are defined by a non-linear function, $\Psi$, and the average of the highest matching scores $u^*$ (e.g., five), $$v_i = \frac{\Psi(u_i)}{\sum_j \Psi(u_j)}, \qquad (6)$$

where $$\Psi(u_i) = \max\left(0, \left(\frac{u_i - \gamma u^*}{u^* - \gamma u^*}\right)\right)^\kappa \qquad (7)$$

In one implementation, a value of 0.5 is assigned to $\gamma$, which means the value of $\Psi(u_i)$ is greater than zero only if the score is greater than half the highest scores. $\kappa=2$ sets the rate of weight decay as quadratic. In Equation (5), $\epsilon=\Psi(u_\epsilon)$ is added to the denominator to force all of the weights towards zero when all the scores are low (e.g., when the drawing has just started), resulting in the shadows not being seen by the user. $U_\epsilon$ is set to correspond to the score after a single stroke is drawn (e.g., of approximately two-hundred pixels). The locally varying weight $V_i$ is set to the spatially varying matching score image $U_i$ as described next.

Note that the weighting technique described above is just one possible technique for computing the weights. Accordingly, it is to be understood that other weighting techniques can be employed as well.

Following is a description of the global matching score u and the spatially varying matching image U. A goal is for a candidate image's score to increase if an edge exists with a similar orientation to a user's stroke. To compute the matching scores, each candidate edge image is decomposed into new images $\theta_t$ (e.g., eight), where t=1 . . . 8 and similarly, the drawing edges into eight images $\tilde{\theta}_t$. Each of the eight images captures only strokes nearly parallel to one of eight evenly spaced orientations. In other words new image $\theta_1$ includes only the horizontal edges, $\theta_5$ depicts vertical edges, and the other six each capture one other orientation. Edge orientation at each pixel is measured by the ratio of second order operators. If an edge's orientation falls inbetween two of the eight discrete orientations, its contribution is linearly divided between the two oriented edge images. To provide some invariance to position, the oriented edge images can be Gaussian blurred with a blur kernel ($\sigma_s$) with standard deviation $\sigma_s=1.25\phi$, where $\phi$ is the relative distance between grid points.

It is also desirable that images that contain multiple edges near a stroke receive the same score contribution as those with a single edge. This is accomplished by enforcing the sum of the blurred oriented edge images at each pixel location to be no more than the maximum possible contribution from a single edge crossing that pixel.

Both the matching positive image $\theta^+$ and negative image $\theta^-$ are computed as the sum of the products of oriented edge images. The positive matches are the products of the images with same orientations, while the negative matches are defined by the products of orthogonally oriented edge images.

$$\vartheta^+ = \sum_{t=1,8} \vartheta_t * \tilde{\vartheta}_t \qquad (8)$$

$$\vartheta^- = \sum_{t=1,8} \vartheta_t * \tilde{\vartheta}_{(t+4)\%8} \qquad (9)$$

Finally, the global matching score $u_i$ is defined as the sum of the differences between the positive and negative matches over all pixels, $$u_i = \sum_p \vartheta_i^+(p) - \vartheta_i^-(p) \qquad (10)$$

and the spatially varying score image is a Gaussian blurred version of the positive match image, $$U_i = G(\theta_i^+, 4\phi) \tag{11}$$

An offset is added to $U_i$ to ensure non-zero values. To reduce computation, the image scores and weights are computed on reduced resolution images (e.g., 40×40 pixels).

As a general summary, a shadow image is computed in realtime by comparing the user-drawn strokes to the candidate images obtained from the database. Global and spatially varying weights are computed to blend the corresponding edge images to create the shadow image used in the drawing interface. These weights are determined by comparing local orientations of edges between the developing drawing and the database edge images.

With respect to the user interface, in one implementation, the user can use a screen/tablet to draw or erase strokes using a stylus. The user sees the evolving drawing formed with pen strokes superimposed on a continuously updating shadow S. The drawing area (e.g., 480×480 pixels) and the line strokes can be rendered using a dark blue marker style. To provide some color contrast, the shadow can be rendered in a sepia tone.

To further make the shadow visible to the user, while not distracting from the user's actual drawing, the shadow image can be filtered to remove noisy and faint edges, $$\tilde{S} = S * (G(S, \sigma_r) - \epsilon) \tag{12}$$

where $\sigma_r = 16$. Multiplying by a blurred shadow image strengthens edges that agree in position, and weakens others. $\epsilon = 1$ is used to additionally suppress faint edges. In addition, a nominal amount of blur can be added with a standard deviation of 1.25 to soften the shadows. Finally, the shadow S' can be weighted to show a higher contrast near the user's cursor position $p_c$:

$$S'(p) = \lambda \tilde{S}(p) + (1 - \lambda) \omega \tilde{S}(p) \tag{13}$$

where $\omega$ is a Gaussian weighted distance between p and $p_c$ with a standard deviation of 120 pixels. Contrast control parameter $\lambda$ may be set by the user and controls the contrast of the shadows.

Put another way, a system is provided that comprises an input component that receives a freeform user stroke in association with an interactive surface, the stroke input to a drawing process that includes an evolving drawing, a database of visual objects, the database stored as an inverted file of indexed sketch values that map to original visual objects and associated object edge images, a search component that performs a search of the inverted file in response to the user stroke using a hashing technique to retrieve matching visual objects, the search component includes an analysis component that analyzes the database of visual objects for candidate objects and processes the candidate objects to return the matching visual objects, and a user interface component that presents a dynamically changing composite image of the matching visual objects proximate the user stroke during the drawing process to guide the drawing process.

The analysis component performs verification of candidate visual objects by, alignment of the candidate visual objects to the evolving drawing to obtain matching scores for the candidate visual objects based on similarity between an edge orientation of the candidate visual object and the user stroke, and computation of weights for the candidate visual objects based on the scores.

The visual objects of the database are indexed by concatenated hashes which are derived from an edge extraction process and patch descriptors. The analysis component computes global and spatially varying scores to blend corresponding edge images of candidate visual objects into the composite image, the scores computed based on comparison of local orientation edges between the evolving drawing and database edge images. The analysis component increases a score for a candidate visual object if an edge exists with a similar orientation to the user stroke.

In yet another embodiment, a system is provided that comprises a source of visual objects, the source includes a database where the visual objects are stored as an inverted file of indexed values (e.g., sketch) that map to original visual objects and associated object edge images, and a search component that performs a search of the inverted file using a hashing technique to retrieve matching visual objects, the search component includes an analysis component that analyzes the source of visual objects for candidate objects and processes the candidate objects to return matching visual objects, the analysis component computes global and spatially varying weights for blending of corresponding edge images of candidate visual objects into a composite image presented as a shadow image for drawing guidance during a drawing process. The search component and the analysis component dynamically update the shadow image in response to strokes input to the drawing process.

The analysis component performs verification of candidate visual objects by, alignment of the candidate visual objects to an evolving drawing to obtain matching scores for the candidate visual objects based on similarity between an edge orientation of the candidate visual object and an input stroke, and computation of weights for the candidate visual objects based on the scores. The visual objects of the database can be indexed by concatenated hashes which are derived from an edge extraction process and patch descriptors. The analysis component computes the weights based on comparison of local orientation edges between an evolving drawing and database edge images. The analysis component increases a score for a candidate visual object if an edge exists with a similar orientation to an input stroke.

Figure 5:
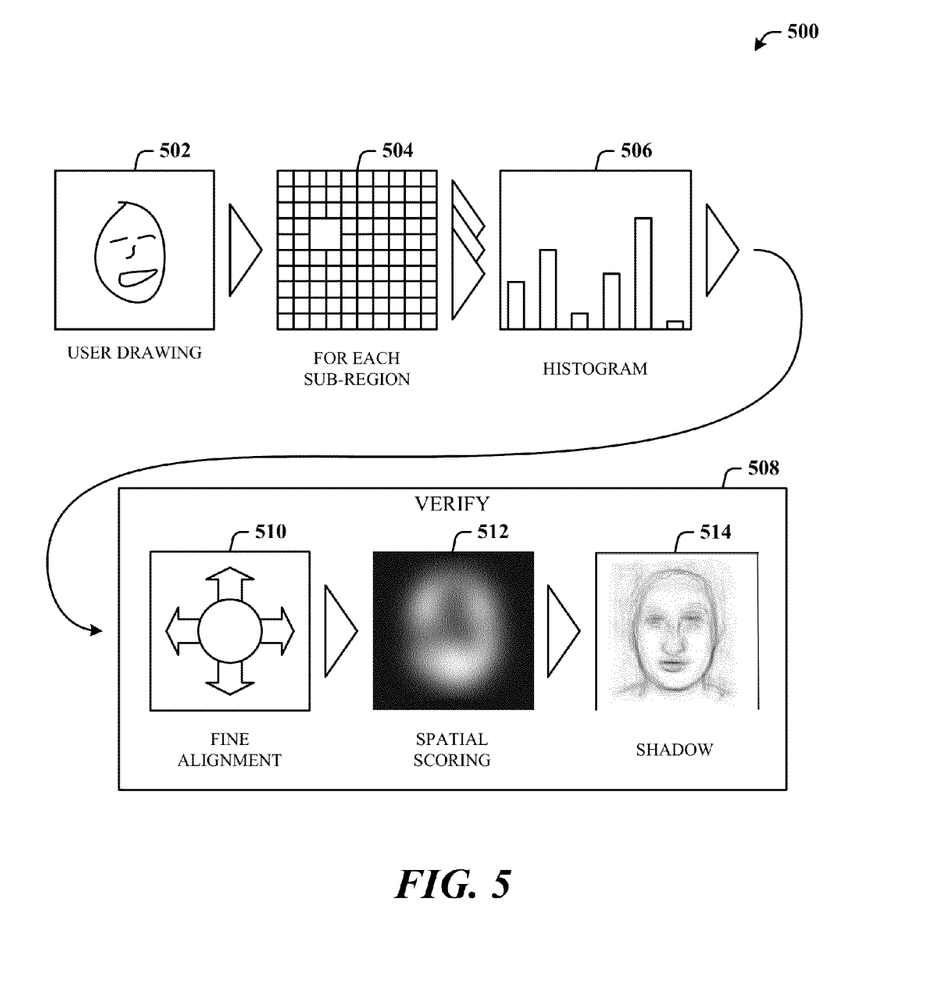
FIG. 5 illustrates a flow diagram for an online processing pipeline for image matching in realtime guidance of freehand drawing.

FIG. 5 illustrates a flow diagram 500 for an online processing pipeline for image matching in realtime guidance of freehand drawing. At 502, user strokes are received on a user drawing. The user drawing is recorded as a set of vectorized multi-segmented strokes. At 504, patch descriptors are determined based on predetermined sub-region patches with a percentage overlap. For each sub-region, matches are aggregated in a histogram 506. Thereafter, a verification process 508 performs fine alignment 510, spatial scoring 512, and outputs the resulting shadow image 514 (composite image).

Figure 6:
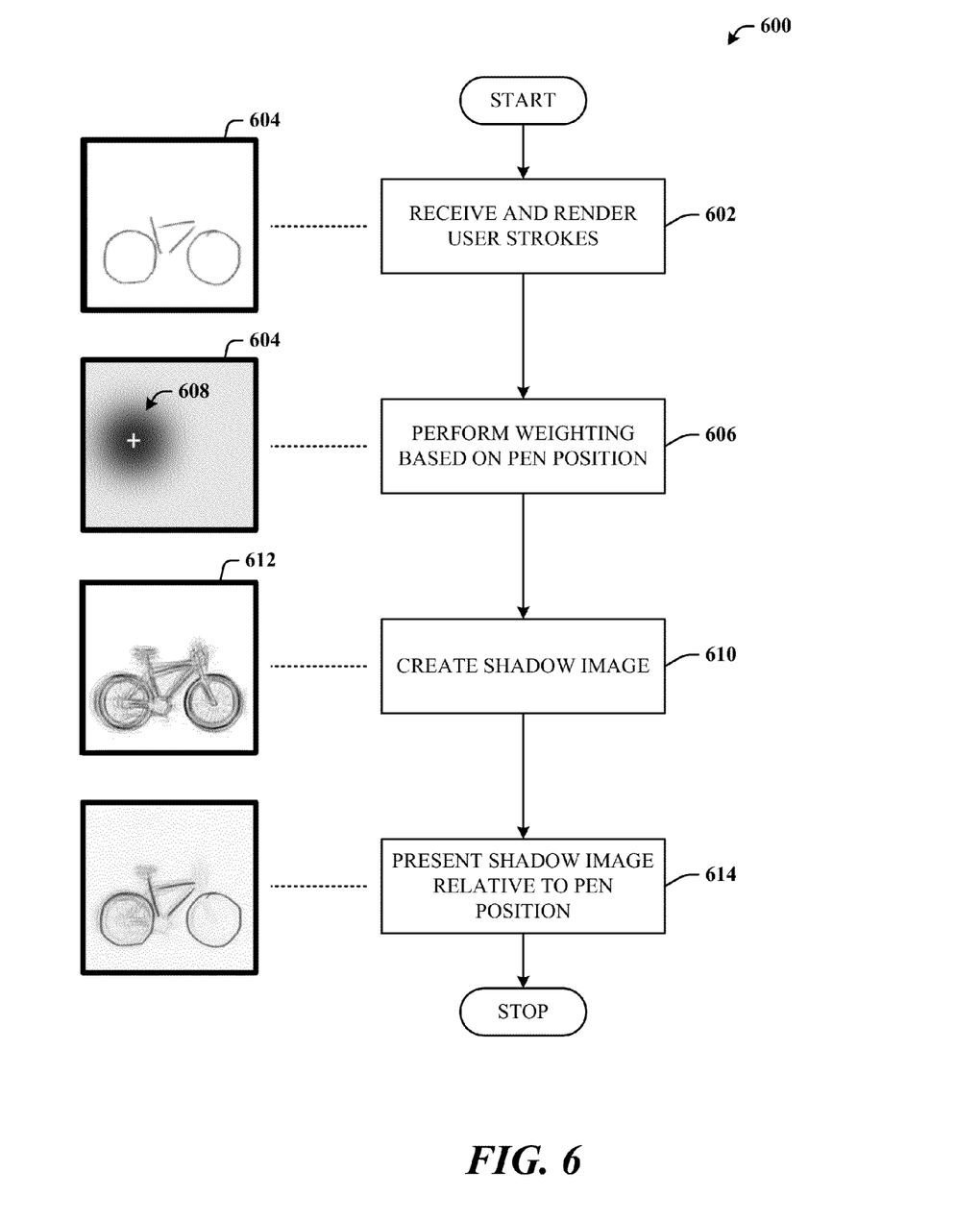
FIG. 6 illustrates a rendering pipeline for the user interface.

FIG. 6 illustrates a rendering pipeline 600 for the user interface. At 602, user strokes are received and rendered. In this example, a bicycle is sketched in the drawing 604. At 606, weighting is performed based on pen position (for a pen-based interactive surface). The pen position 608 is represented in the drawing 604. At 610, a shadow image 612 is created. At 614, the shadow image 612 is presented relative to the pen position 608. In other words, the shadow image 612 can be presented under (and perhaps slightly offset from) the drawing 604.

Figure 7:
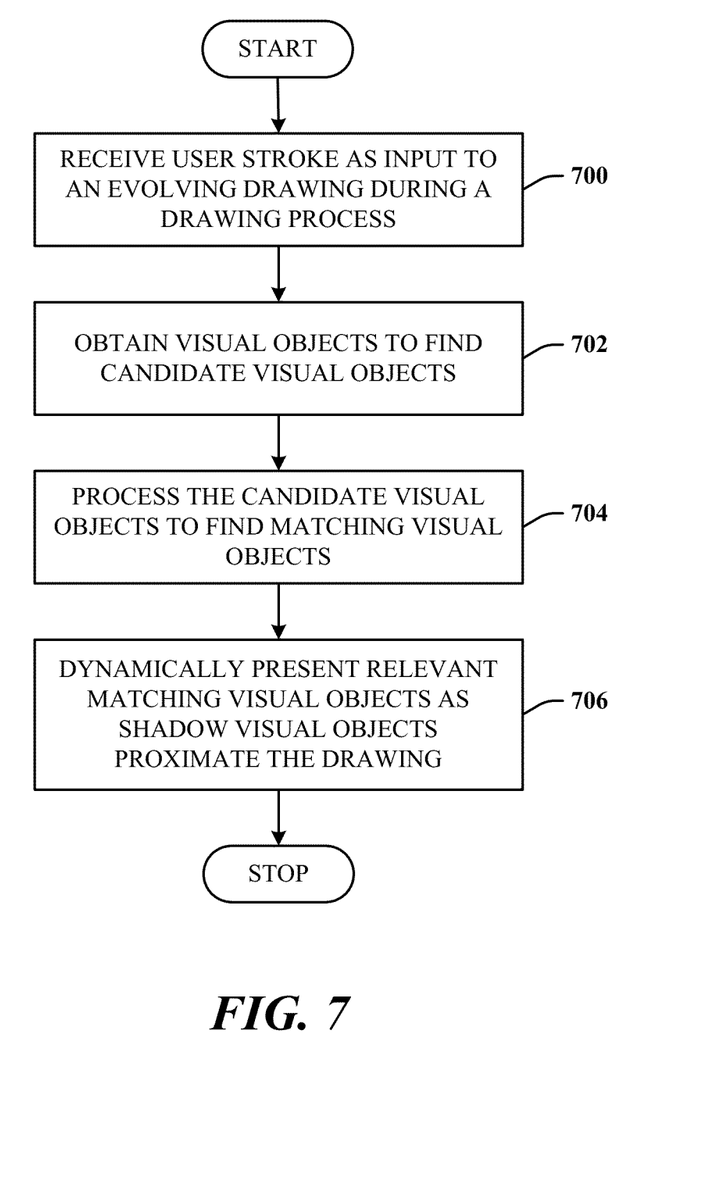
FIG. 7 illustrates a computer-implemented method in accordance with the disclosed architecture.
Figure 8:
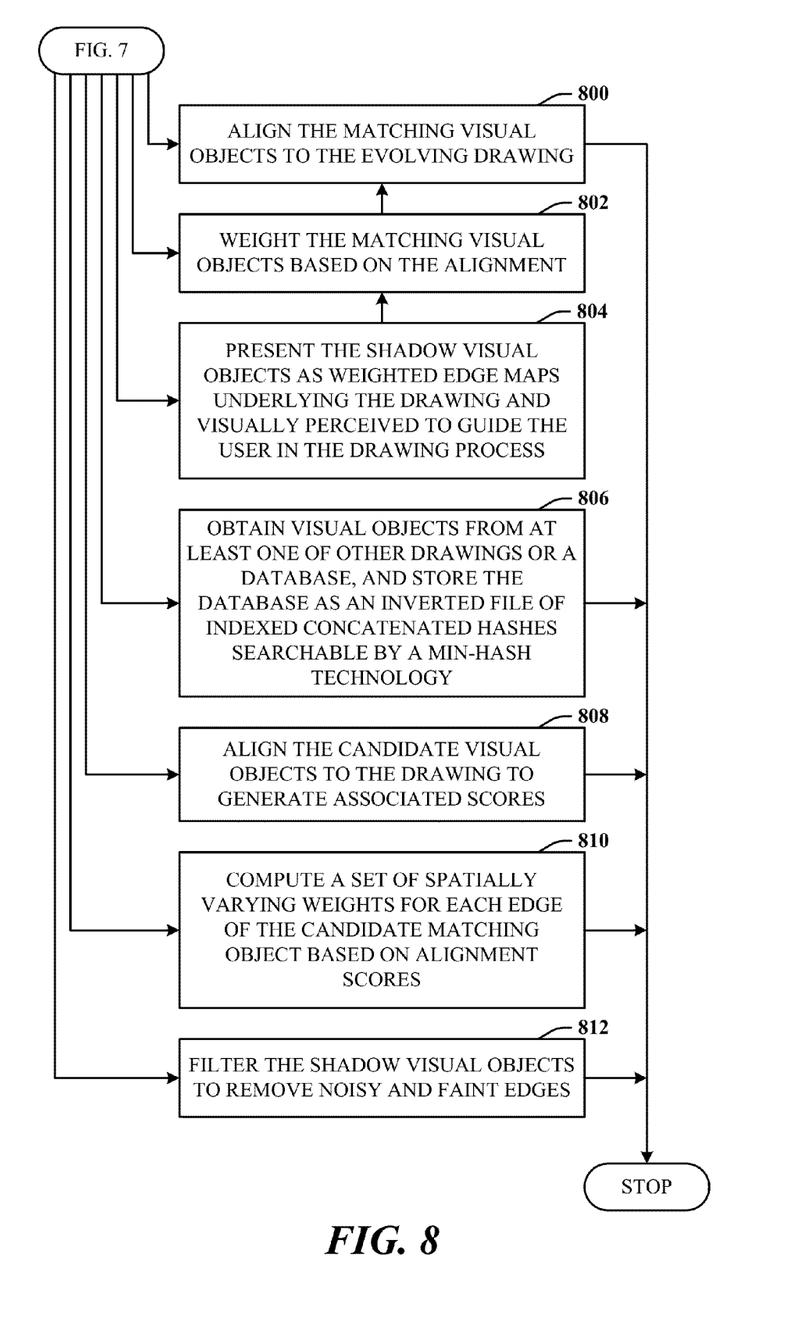
FIG. 8 illustrates further aspects of the method of FIG. 7.

FIG. 7 illustrates a computer-implemented method in accordance with the disclosed architecture. At 700, a user stroke is received as input to an evolving drawing during a drawing process. At 702, visual objects are obtained to find candidate visual objects. At 704, the candidate visual objects are processed to find matching visual objects. At 706, relevant matching visual objects are dynamically presented as shadow visual objects proximate the drawing FIG. 8 illustrates further aspects of the method of FIG. 7. Note that the flow indicates that each block can represent a step that can be included, separately or in combination with other blocks, as additional aspects of the method represented by the flow chart of FIG. 7. At 800, the matching visual objects are aligned to the evolving drawing. At 802, the matching visual objects are weighted based on the alignment. At 804, the shadow visual objects are presented as weighted edge maps underlying the drawing and visually perceived to guide the user in the drawing process. At 806, the visual objects are obtained from other drawings and/or a database, the database is stored as an inverted file of indexed concatenated hashes searchable by a min-hash technology. At 808, the candidate visual objects are aligned to the drawing to generate associated scores. At 810, a set of spatially varying weights is computed for each edge of the candidate matching object based on alignment scores. At 812, the shadow visual objects are filtered to remove noisy and faint edges.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
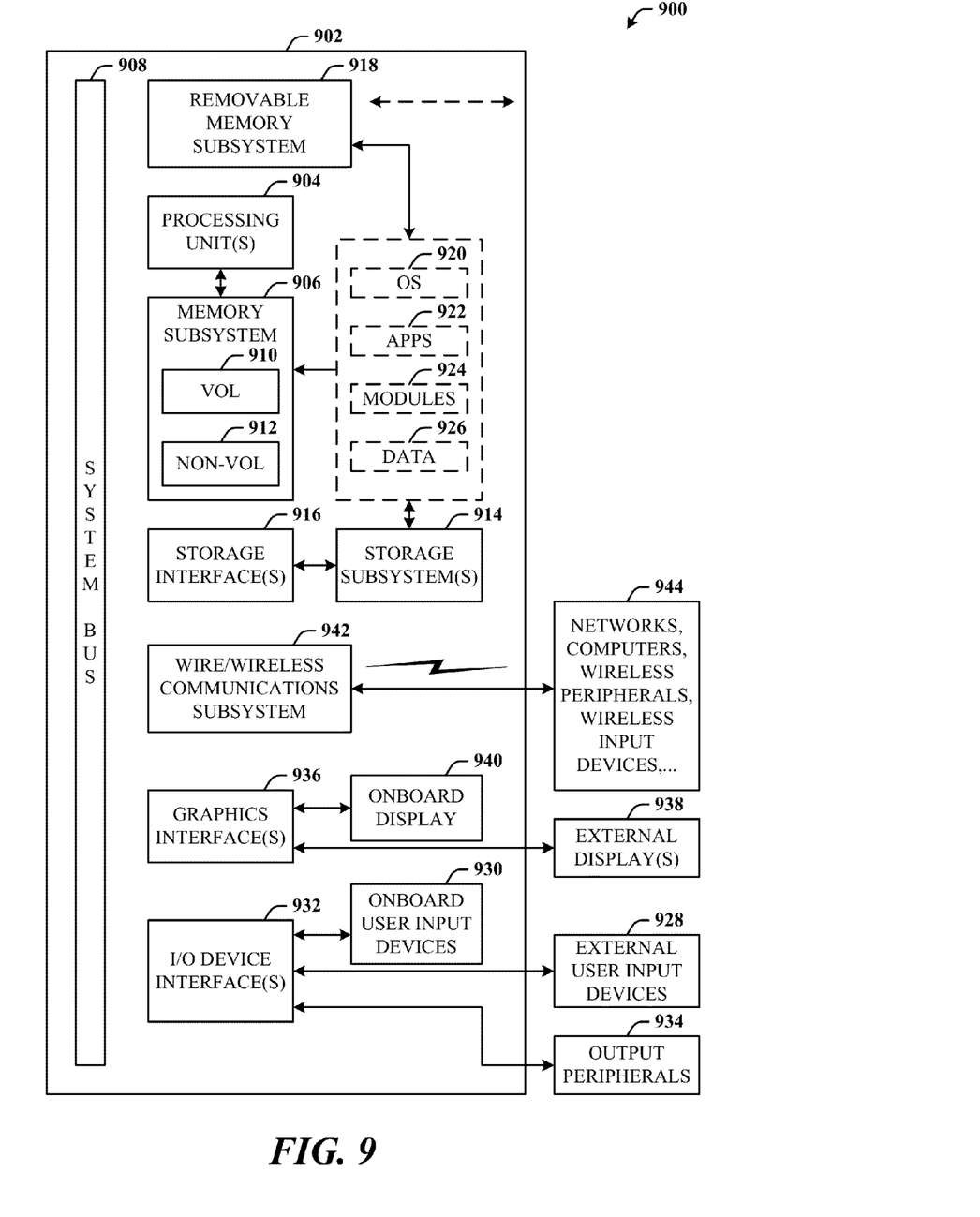
FIG. 9 illustrates a block diagram of a computing system that executes realtime user guidance for freehand drawing in accordance with the disclosed architecture.

Referring now to FIG. 9, there is illustrated a block diagram of a computing system 900 that executes realtime user guidance for freehand drawing in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 9 and the following description are intended to provide a brief, general description of the suitable computing system 900 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 900 for implementing various aspects includes the computer 902 having processing unit(s) 904, a computer-readable storage such as a system memory 906, and a system bus 908. The processing unit(s) 904 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 906 can include computer-readable storage (physical storage media) such as a volatile (VOL) memory 910 (e.g., random access memory (RAM)) and non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the system memory 906 to the processing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes machine readable storage subsystem(s) 914 and storage interface(s) 916 for interfacing the storage subsystem(s) 914 to the system bus 908 and other desired computer components. The storage subsystem(s) 914 (physical storage media) can include one or more of a hard disk drive (HDD), a magnetic floppy disk drive (FDD), and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a machine readable and removable memory subsystem 918 (e.g., flash drive form factor technology), and/or the storage subsystem(s) 914 (e.g., optical, magnetic, solid state), including an operating system 920, one or more application programs 922, other program modules 924, and program data 926.

The operating system 920, one or more application programs 922, other program modules 924, and/or program data 926 can include the entities and components of the system 100 of FIG. 1, the entities and components of the system 200 of FIG. 2, the entities, components, and flow of the diagram 500 of FIG. 5, the entities and components of the rendering pipeline 600 of FIG. 6, and the methods represented by the flowcharts of FIGS. 3, 4, 7, and 8, for example.

Generally, programs include routines, methods, data structures, other software components, etc., that perform particular tasks or implement particular abstract data types. All or portions of the operating system 920, applications 922, modules 924, and/or data 926 can also be cached in memory such as the volatile memory 910, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 902 and includes volatile and non-volatile internal and/or external media that is removable or non-removable. For the computer 902, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 902, programs, and data using external user input devices 928 such as a keyboard and a mouse. Other external user input devices 928 can include a microphone, an IR (infrared) remote control, a joystick, a game pad, camera recognition systems, a stylus pen, touch screen, gesture systems (e.g., eye movement, head movement, etc.), and/or the like. The user can interact with the computer 902, programs, and data using onboard user input devices 930 such a touchpad, microphone, keyboard, etc., where the computer 902 is a portable computer, for example. These and other input devices are connected to the processing unit(s) 904 through input/output (I/O) device interface(s) 932 via the system bus 908, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP-based) using logical connections via a wired/wireless communications subsystem 942 to one or more networks and/or other computers. The other computers can include workstations, servers, routers, personal computers, microprocessor-based entertainment appliances, peer devices or other common network nodes, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated and described aspects can be practiced in distributed computing environments where certain tasks are performed by remote processing devices that are linked through a communications network. In a distributed computing environment, program modules can be located in local and/or remote storage and/or memory system.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processing device; and
a storage device storing computer-executable instructions which, when executed by the processing device, cause the processing device to:
receive a freeform user stroke in association with an interactive surface, the freeform user stroke being input to a drawing process by a user for an evolving drawing;
in response to the freeform user stroke, search for and retrieve a visual object;
process the visual object to identify matching object portions which match parts of the evolving drawing;
present a dynamically changing composite image of the matching object portions proximate the evolving drawing during the drawing process to guide the user to potential future strokes;
receive subsequent freeform user strokes to generate an updated evolving drawing, wherein the updated evolving drawing includes the freeform user stroke and the subsequent freeform user strokes;
in response to the subsequent freeform user strokes, search for and retrieve subsequent visual objects;
process the subsequent visual objects to identify subsequent matching object portions which match updated parts of the updated evolving drawing;
update the dynamically changing composite image with the subsequent matching object portions; and
concurrently display the updated evolving drawing and the updated dynamically changing composite image, wherein the updated evolving drawing is superimposed on the updated dynamically changing composite image to guide the user to further potential future strokes for the updated evolving drawing.

2. The system of claim 1, wherein the dynamically changing composite image suggests drawing contours and guides the user during the drawing process.

3. The system of claim 1, wherein the visual object is obtained from a database, the database stored as an inverted file of indexed sketch values that map to the visual object and associated object edges of the visual object.

4. The system of claim 1, wherein the computer-executable instructions further cause the processing device to identify the matching object portions by:
  aligning object edges of the visual object to the evolving drawing to obtain matching scores, and
  computing weights for the object edges based on the matching scores.

5. The system of claim 4, wherein the computer-executable instructions further cause the processing device to compute the matching scores for the object edges based on similarity between edge orientations of the object edges and the freeform user stroke.

6. The system of claim 4, wherein the weights are global and spatially varying weights for the object edges, and the computer-executable instructions further cause the processing device to blend the object edges into the dynamically changing composite image using the global and spatially varying weights.

7. The system of claim 6, wherein the computer-executable instructions further cause the processing device to filter the dynamically changing composite image to remove noisy or faint edges of the object edges.

8. The system of claim 1, embodied as a single hand-held computing device.

9. A method implemented by one or more processing devices, the method comprising:
  receiving a freeform user stroke in association with an interactive surface, the freeform user stroke being input to a drawing process by a user for an evolving drawing;
  in response to the freeform user stroke, searching for and retrieving a visual object;
  processing the visual object to identify matching object portions which match parts of the evolving drawing;
  presenting a dynamically changing composite image of the matching object portions proximate the evolving drawing during the drawing process to guide the user to potential future strokes;
  receiving subsequent freeform user strokes to generate an updated evolving drawing, wherein the updated evolving drawing includes the freeform user stroke and the subsequent freeform user strokes;
  in response to the subsequent freeform user strokes, searching for and retrieving subsequent visual objects;
  processing the subsequent visual objects to identify subsequent matching object portions which match updated parts of the updated evolving drawing;
  updating the dynamically changing composite image with the subsequent matching object portions; and
  concurrently displaying the updated evolving drawing and the updated dynamically changing composite image, wherein the updated evolving drawing is superimposed on the updated dynamically changing composite image to guide the user to further potential future strokes for the updated evolving drawing.

10. The method of claim 9, wherein the visual object is obtained from a database, the database stored as an inverted file of indexed sketch values that map to the visual object and associated object edges of the visual object.

11. The method of claim 10, wherein the visual object is indexed by concatenated hashes which are derived from an edge extraction process and patch descriptors.

12. The method of claim 9, wherein the visual object is obtained from a database, the database stored as an inverted file of indexed concatenated hashes searchable by a min-hash technology.

13. The method of claim 9, wherein the presenting the dynamically changing composite image of the matching object portions proximate the evolving drawing further comprises presenting the evolving drawing superimposed on at least part of the dynamically changing composite image without modifying the evolving drawing based on the matching object portions.

14. The method of claim 9, the processing the visual object further comprising verification of the visual object by aligning object edges of the visual object to at least part of the evolving drawing to obtain matching scores.

15. The method of claim 14, the processing the visual object further comprising computing weights for the object edges based on the matching scores.

16. The method of claim 15, the presenting the dynamically changing composite image being based at least in part on the weights.

17. A computer readable memory device or storage device storing computer readable instructions that, when executed by one or more processing devices, cause the one or more processing devices to perform acts comprising:
  receiving a freeform user stroke in association with an interactive surface, the freeform user stroke being input to a drawing process by a user for an evolving drawing;
  in response to the freeform user stroke, searching for and retrieving a visual object;
  processing the visual object to identify matching object portions which match parts of the evolving drawing;
  presenting a dynamically changing composite image of the matching object portions proximate the evolving drawing during the drawing process to guide the user to potential future strokes;
  receiving subsequent freeform user strokes to generate an updated evolving drawing, wherein the updated evolving drawing includes the freeform user stroke and the subsequent freeform user strokes;
  in response to the subsequent freeform user strokes, searching for and retrieving subsequent visual objects;
  processing the subsequent visual objects to identify subsequent matching object portions which match updated parts of the updated evolving drawing;
  updating the dynamically changing composite image with the subsequent matching object portions; and
  concurrently displaying the updated evolving drawing and the updated dynamically changing composite image, wherein the updated evolving drawing is superimposed on the updated dynamically changing composite image to guide the user to further potential future strokes for the updated evolving drawing.

18. The computer readable memory device or storage device of claim 17, the processing the visual object further comprising aligning the visual object to the freeform user stroke in the evolving drawing.

19. The computer readable memory device or storage device of claim 18, the processing the visual object further comprising weighting the visual object based on the aligning.

20. The computer readable memory device or storage device of claim 19, the presenting the dynamically changing composite image further comprising presenting the matching object portions based on the weighting of the visual object.

\* \* \* \* \*